United States Patent [19]
Black et al.

[11] Patent Number: 6,160,681
[45] Date of Patent: Dec. 12, 2000

[54] METHOD FOR PREVENTING EXCESSIVE FORCE EXERTED ON A LEVER ASSEMBLY

[75] Inventors: David Christopher Black, Thornton; Joseph Paul Manes, Arvada; Lester Marvin Yeakley, Estes Park, all of Colo.

[73] Assignee: Storage Technology Corporation, Louisville, Colo.

[21] Appl. No.: 09/387,490

[22] Filed: Sep. 1, 1999

Related U.S. Application Data

[60] Division of application No. 08/987,541, Dec. 9, 1997, Pat. No. 5,991,117, which is a continuation-in-part of application No. 08/647,711, May 14, 1996, Pat. No. 5,973,876.

[51] Int. Cl.[7] .......................... G11B 33/00; G11B 15/68; G11B 15/675
[52] U.S. Cl. .......................... 360/137; 360/92; 360/96.5; 242/337; 242/338.4
[58] Field of Search .......................... 360/137, 92, 96.5; 242/337, 338.4

[56] References Cited

U.S. PATENT DOCUMENTS

| | | | |
|---|---|---|---|
| 1,910,125 | 5/1933 | Root | 74/556 |
| 4,675,762 | 6/1987 | Noda et al. | 360/99.02 |
| 4,688,122 | 8/1987 | Takai et al. | 360/96.5 |
| 4,698,707 | 10/1987 | Heys, Jr. et al. | 360/99.12 |
| 4,773,240 | 9/1988 | Foshee | 70/422 |
| 5,010,755 | 4/1991 | Best | 70/422 |
| 5,605,082 | 2/1997 | Tarpill | 81/475 |
| 5,617,749 | 4/1997 | Park | 70/422 |
| 5,619,874 | 4/1997 | Myers | 70/422 |
| 5,651,280 | 7/1997 | Park | 70/422 |
| 5,774,301 | 6/1998 | Manes et al. | 360/92 |

FOREIGN PATENT DOCUMENTS

| | | |
|---|---|---|
| 0 109 154 A2 | 5/1984 | European Pat. Off. . |
| 0 647 752 A2 | 4/1995 | European Pat. Off. . |
| 44 10 783 C1 | 4/1995 | Germany . |
| 44 08 910 A1 | 9/1995 | Germany . |

*Primary Examiner*—Craig A. Renner
*Attorney, Agent, or Firm*—Wayne P. Bailey

[57] ABSTRACT

A system prevents an excessive force from being applied to a handle of a tape drive. The system provides a base coupled to the handle of the tape drive. A lever assembly engages the base to move the handle when a force equal to the force required to move the handle is applied to the lever assembly. The lever assembly disengages the base when a force in excess of the required force is applied to the lever assembly and the force is not applied to the handle.

10 Claims, 5 Drawing Sheets

METHOD FOR PREVENTING EXCESSIVE FORCE EXERTED ON A LEVER ASSEMBLY

CROSS REFERENCE TO A RELATED APPLICATION

This is a division of application Ser. No. 08/987,541 filed on Dec. 9, 1997, now U.S. Pat. No. 5,991,117, issued Nov. 23, 1999, which is a continuation-in-part of prior application Ser. No. 08/647,711 filed May 14, 1996, now U.S. Pat. No. 5,973,876, issued Oct. 26, 1998.

FIELD OF THE INVENTION

The present invention relates to the use of a tape drive in an automated data library. More particularly, the present invention relates to a mechanism to facilitate operating a tape drive handle with a robotic arm. Still more particularly, the present invention relates to a mechanism for preventing excessive force exerted either manually or by the robotic arm from damaging the tape drive.

PROBLEM

Commercially available tape drives, such as a 2000, 4000, or 7000 Series tape drive from Quantum Corporation of Shrewsbury, Mass., have a drive bay with an interior tape receiving compartment. A handle permits frontal access to the tape receiving compartment for inserting and removing tape cartridges to and from the tape drive. The handle is affixed to a pivot rod and is toggled between an open or a closed position when the pivot rod rotates. In the open position, the handle allows access to the tape receiving compartment for inserting or removing a tape cartridge. In the closed position, the handle prevents access to the tape receiving compartment and a tape cannot be removed or inserted.

In order to insert a tape cartridge, the pivot rod rotates to move the handle to the open position. The tape cartridge is inserted into the compartment by a user. The handle is then moved to the closed position which moves internal drive components to unlock a tape spool in the tape cartridge and to engage a drive motor with the tape spool. The tape drive then completes all desired read/write operations to and from the tape in the cartridge.

During read and write operations on a tape, a conventional solenoid lock assembly controlled by internal circuitry locks the handle in the closed position to prevent the untimely removal of the tape cartridge. Upon completion of the read/write operations, the internal circuitry unlocks the solenoid lock assembly and the handle is free to move to the open position. In order to remove the tape cartridge, the handle is moved to the open position. The moving of the handle causes the tape cartridge to be ejected from the tape receiving compartment. The tape cartridge may then be removed from the tape drive and replaced with a different tape cartridge.

The opening and closing of the tape drive handle is generally not a problem in manual use. A user moves the handle from the closed to the open position, inserts a tape and closes the tape drive. When the tape drive completes the read and write operations, the user moves the handle to the open position and removes the tape. It is a problem for a robotic arm in a data storage library to toggle the handle between the open and closed positions. One particular problem is that the structure of the tape drive interferes with the motion required by the robotic arm to move the handle.

One method of facilitating the movement of the handle by a robotic arm is to coaxially affix a lever to the pivot rod. The lever extends outwardly away from the tape drive. This allows the robotic arm to maneuver in a less confined space to move the handle. The robotic arm rotates the lever which causes the pivot rod to rotate and to move the handle.

It is a problem that the robotic arm or an individual operating the handle via the lever may exert excessive force on the lever. The excessive force could damage the pivot rod, the handle, or another internal component of the tape drive. One example of when an individual or a robotic arm may exert excessive force on the lever is when the handle is locked in position by the solenoid lock assembly. The locking of the handle in the closed position is typically not a problem in the manual use of the tape drive. A user that attempts to rotate the locked handle feels the resistance of the lock, and stops attempting to rotate the handle. This prevents the user from damaging the pivot rod or other internal circuitry. A robotic arm is typically programmed to complete a series of motions to complete a task and is not programmed to feel or respond to resistance. When the handle is locked in the closed position by the solenoid lock assembly and the robotic arm attempts to move the handle, the robotic arm increases the force exerted on the lever to overcome the resistance of the lock and complete the programmed motion. Similarly, the affixed lever provides greater leverage on the pivot rod than does the handle during a manual operation. As a result, the operator may unknowingly apply a very high force to pivot rod. The increased force can damage the pivot rod or other internal components of the tape drive.

There is a long felt need in the art for a mechanism that allows a robotic arm to move the tape drive handle while preventing an individual or the robotic arm from applying excessive force to the handle of the tape drive.

SOLUTION

The above and other problems are solved and an advance in the art is achieved by the provision of a break away lever for a tape drive. A break away lever is coaxially coupled to a pivot rod of a tape drive handle. If the amount of force needed to rotate the pivot rod is applied to the break away lever, the break away lever engages the pivot rod and causes the pivot rod to rotate. The rotating of the pivot rod causes the handle to toggle between an open and closed position. If the force applied to the lever is in excess of the amount needed to rotate the pivot rod, the break away lever disengages from the pivot rod of the handle to prevent damage to the tape drive.

A break away lever includes a base and a lever assembly. The base is coaxially coupled to the pivot rod of the handle. The lever assembly is coaxially mounted on the base. In order to toggle the position of the tape drive handle, a a force is exerted on the lever assembly to rotate the pivot rod. When a force equal to or less than the force required to rotate the pivot rod is applied to the lever assembly, the lever assembly engages the base and causes the base to rotate which in turn rotates the pivot rod. When the amount of force applied to the lever is in excess of the force needed to rotate the pivot rod, the lever assembly disengages the base. The disengaged lever rotates freely and does not rotate the base. Since the base is not rotated, the pivot rod likewise is not rotated and damage to the tape drive is prevented.

In one preferred exemplary embodiment, the base is a rotary wheel and the lever assembly is a gear wheel with an arm projecting from the circumference of the gear wheel. The rotary wheel is coaxially coupled to the pivot rod. The gear wheel is coaxially mounted on the rotary wheel. The gear wheel has teeth defined by protrusions on a first surface of the gear wheel facing the base. Each tooth has two sides radial to the gear wheel. Each of the two sides of a tooth are sloped upwards and inwards to define ramps on the sides of the tooth.

The rotary wheel has slots in a surface facing the gear wheel. Each slot is mated to receive a tooth on the first surface of the gear wheel. Each slot has two walls radial to the rotary wheel. Each of the walls is sloped at the same angle as the sloped sides of the teeth. A coil spring mounted coaxially to the pivot rod on a second surface of the gear wheel applies a force to the gear wheel forcing the teeth of the gear wheel to remain inside the slots on the rotary wheel.

When a predetermined amount of force is applied to the arm, the teeth of the gear wheel remain in the slots of the rotary wheel and cause the rotary wheel to rotate. The rotary wheel rotates the pivot rod which toggle the handle of the tape drive. When a force in excess of the sufficient force is applied to the shaft, the force of friction and the force of the coil spring are overcome and the sloped sides of the teeth slide up the sloped walls of the slots disengaging the lever assembly from the base. This allows the lever assembly to rotate freely about the axis of the pivot rod without rotating the base and the pivot rod.

The break away lever may also have reset ramps to reset the lever when the excessive force is no longer being exerted on the arm of the lever. In the preferred exemplary embodiment, the rotary wheel has reset ramps that are defined by protrusions which slope upward from an edge of each slot. When teeth on the gear wheel become disengaged from the mated slots, the teeth slide upward along the reset ramps as the gear wheel rotates. When the excessive force is no longer being exerted on the arm, the teeth on the gear wheel slide downward on the reset ramps and into the mated slots.

These and other advantages of a break away lever will be apparent to those skilled in the art upon a reading of the discussion below in combination with the accompanying drawings.

DETAILED DESCRIPTION

Figure 1:
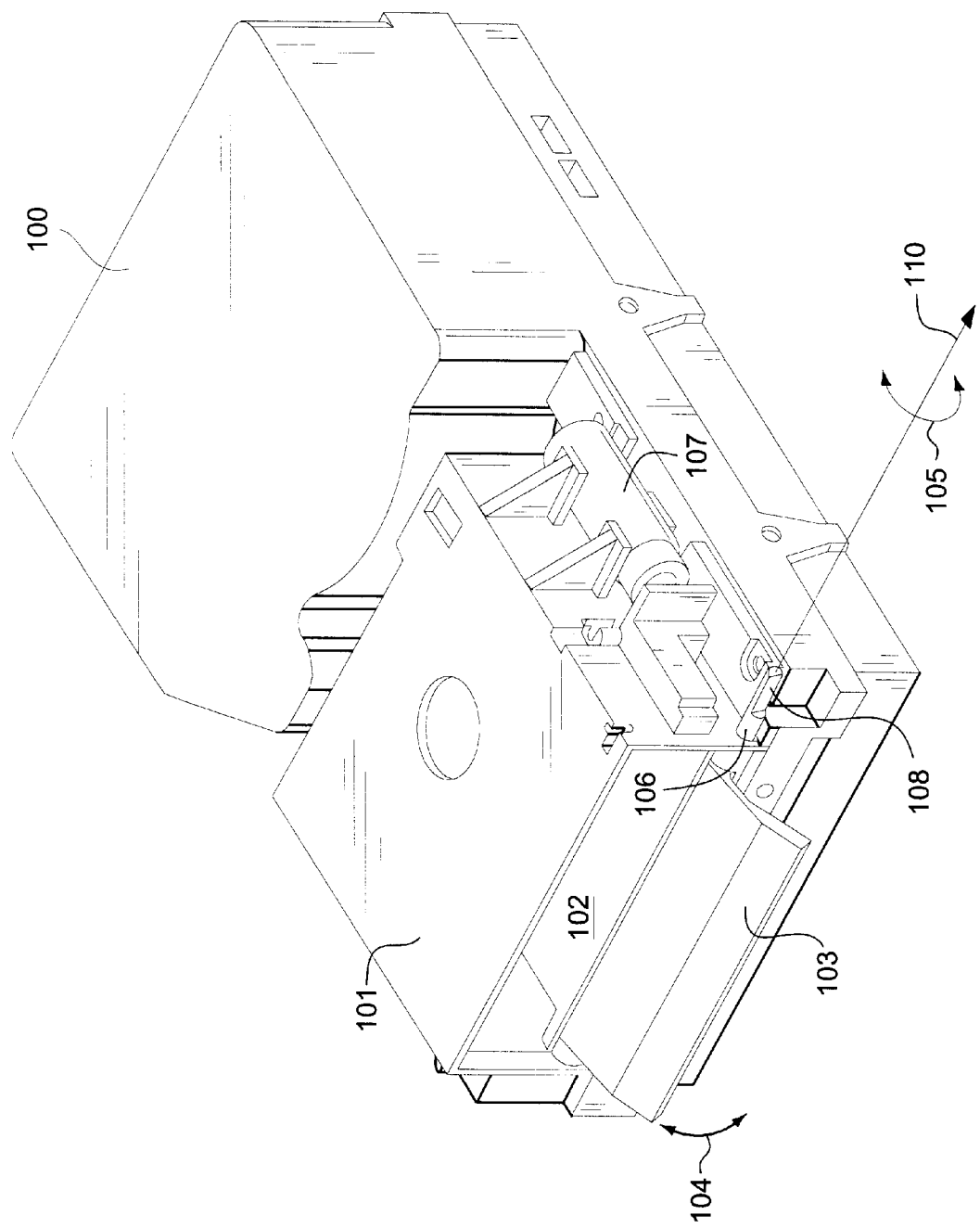
FIG. 1 illustrates a typical commercially available tape drive.

FIG. 1 illustrates a typical commercially available tape drive 100. A tape cartridge (not shown) is inserted into tape receiving compartment 102 of tape bay 101. Handle 103 is in either an extended, open position as shown in FIG. 1 to allow access to tape receiving compartment 102 or in a retracted, closed position (not depicted) to prevent access to tape receiving compartment 102. Handle 103 is affixed to pivot rod 106 which rotates about axis 110 in the directions indicated by arrow 105 to move handle 103 between the open and closed positions. Solenoid lock assembly 107 locks handle 103 in the closed position to prevent an untimely attempt to remove or insert a tape cartridge into compartment 102 while read and write operations are being performed by tape drive 100.

A tape cartridge is inserted into tape drive 100 in the following manner. A user moves handle 103 to the extended, open position shown in FIG. 1 along the path indicated by arrow 104. The tape cartridge (not shown) is inserted into compartment 102 of tape bay 101. Handle 103 is moved by the user along the path indicated by arrow 104 to the retracted, closed position (not shown). The pivoting of handle 103 provides minor positional adjustments of the tape cartridge to place the tape cartridge into compartment 102, latches the cartridge within compartment 102 by moving internal components (not shown), unlocks a tape spool in the cartridge, and couples a drive motor (not shown) to the tape spool. Solenoid lock assembly 107 locks handle 103 in the closed position to prevent attempts to remove the tape cartridge while tape drive 100 performs read and write operations on the tape in the loaded cartridge.

A tape cartridge is removed from tape drive 100 in the following manner. After the read and write operations are complete, solenoid lock assembly 107 disengages and handle 103 is free to move from the retracted, closed position to the extended, open position. In order to remove the tape cartridge, a user moves the handle along the path indicated by arrow 104 to the extended open position. The movement of the handle causes the tape cartridge to eject from compartment 102 to a position where the tape cartridge may be grasped and removed by a user.

A robotic hand inserting and removing tapes cannot operate handle 103 to rotate the handle between the open and closed positions. The structure of tape drive 100 interferes with the motions required by a robotic hand to move the handle between the open and closed positions. In order to facilitate the moving of handle 103 between the open and closed positions by a robotic hand, a lever (as shown on FIG. 2) must be attached to end 108 of pivot rod 106. However, it is a problem that an operator or the robotic arm could damage tape drive by twisting the pivot rod 106 or in some other manner if excessive force is applied to the lever rotating pivot rod 106. One cause of excessive force to pivot rod 106 is attempting to move handle 103 while solenoid lock assembly 107 is engaged to lock handle 103 in the closed position.

Figure 2:
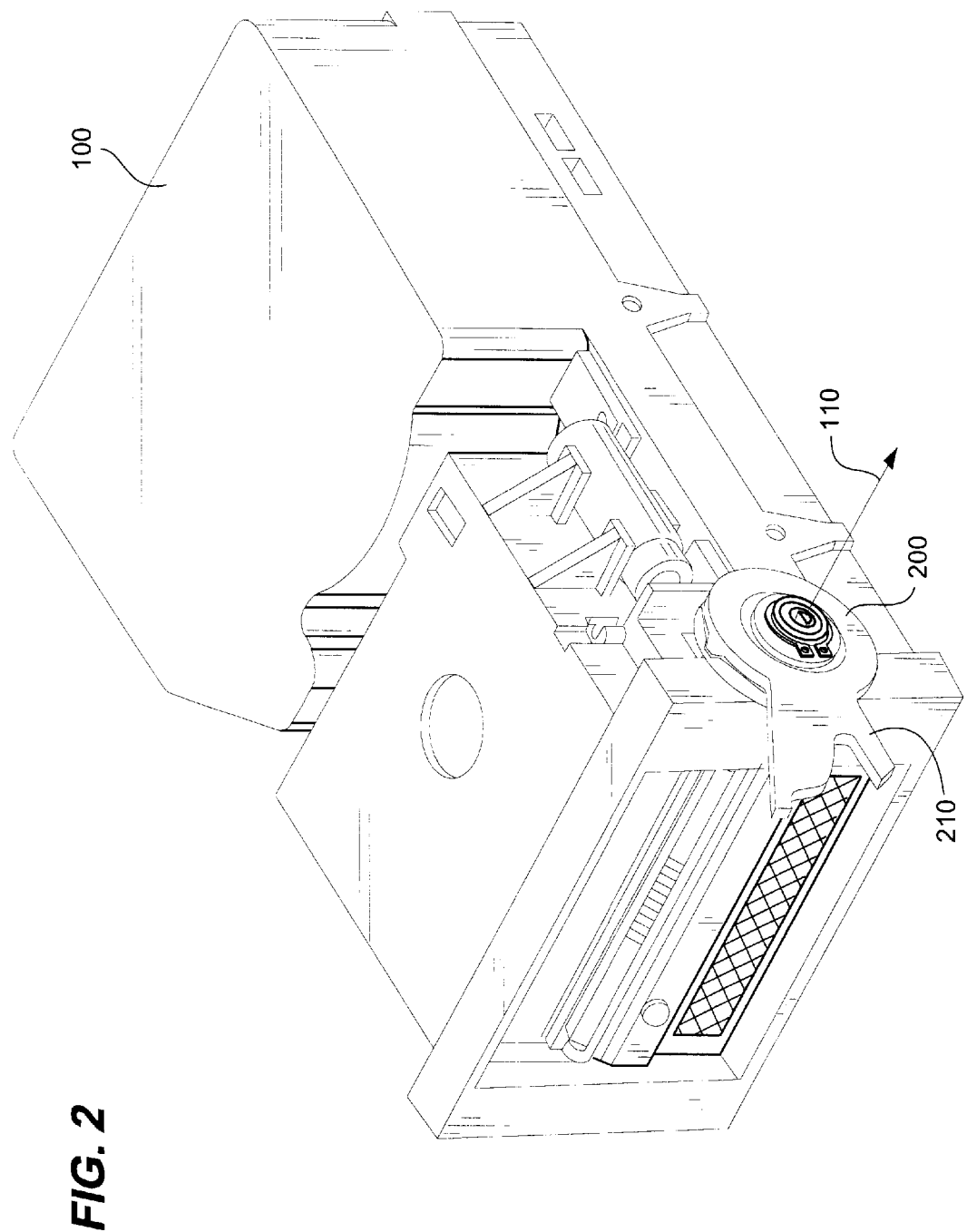
FIG. 2 illustrates a preferred exemplary embodiment of a break away lever affixed to a tape drive.

FIG. 2 illustrates break away lever 200 affixed to pivot rod 106 of tape drive 100. Break away lever 200 is coaxially mounted on pivot rod 106 and rotates about axis 110 in response to a force being exerted on arm 210. In order to facilitate use by a robotic arm, arm 210 extends outward from tape drive 100. Further details of break away lever 200 are described below. Although, a preferred embodiment is described for rotating pivot rod 106, it is envisioned the present invention can be used to move a handle in other motions, such as linearly.

Figure 3:
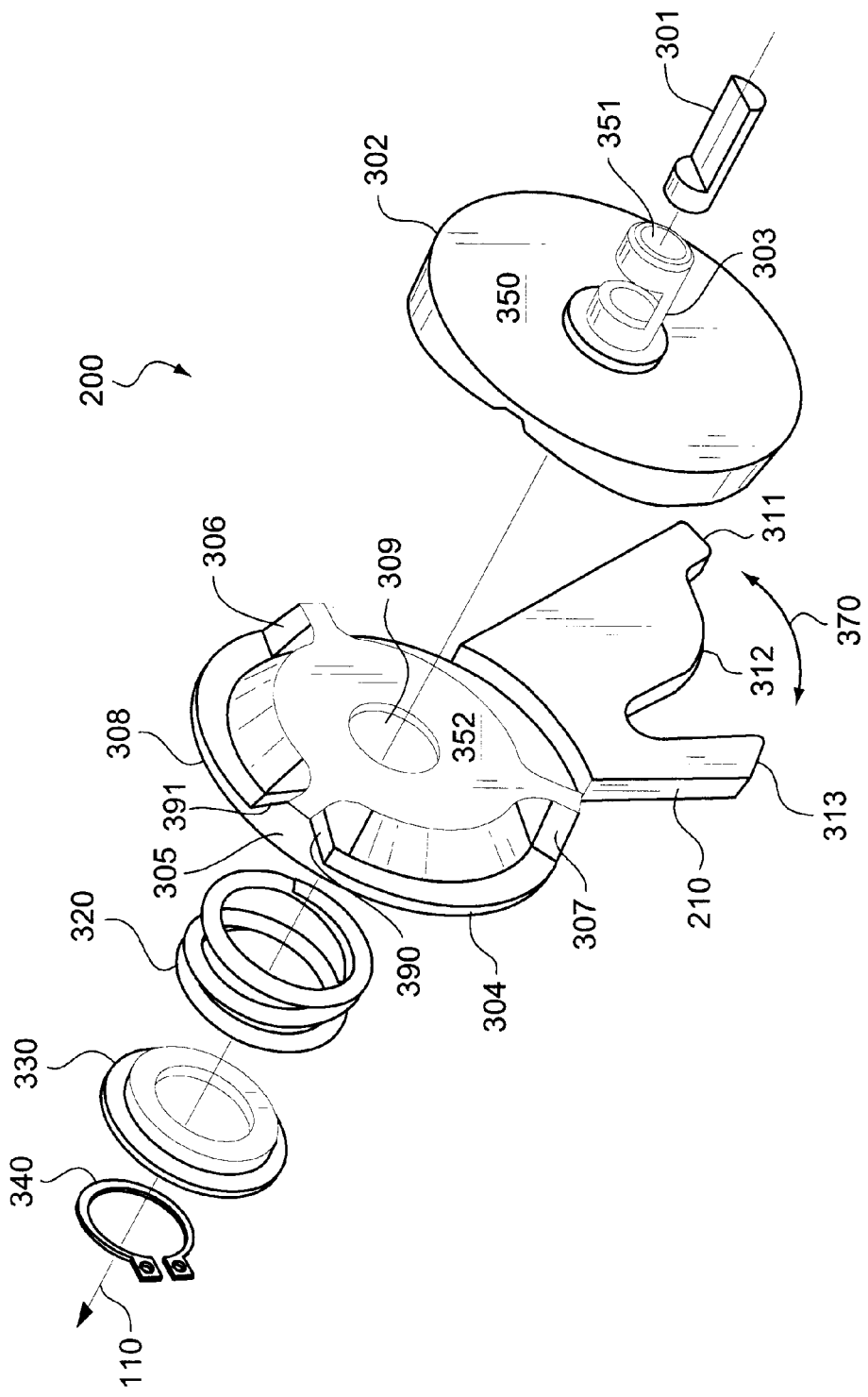
FIG. 3 illustrates an exploded view from a first side of a preferred exemplary embodiment of the present invention.
Figure 4:
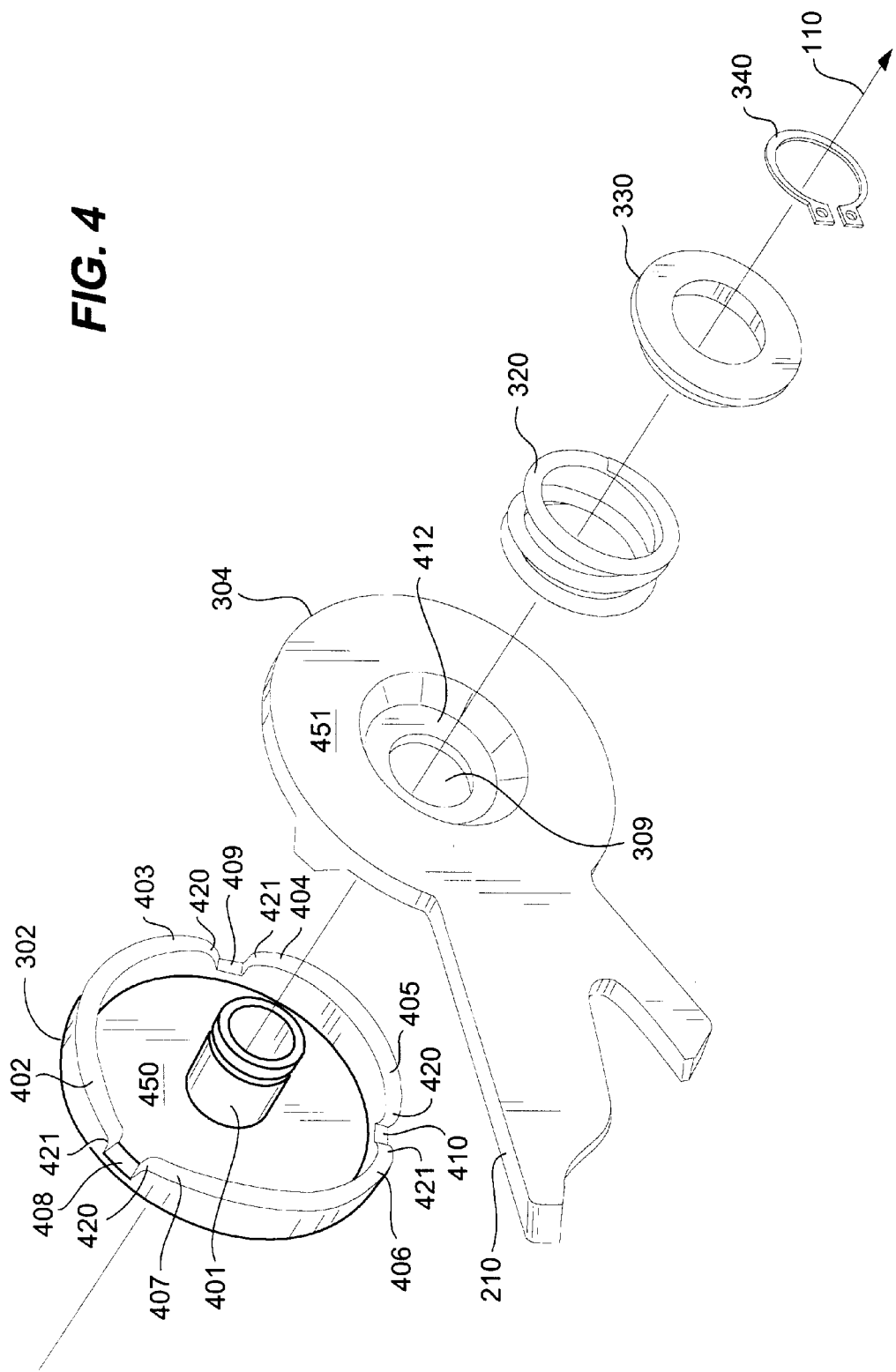
FIG. 4 illustrates an exploded view from a second side of the preferred exemplary embodiment.

FIGS. 3 and 4 illustrate an exploded view of a preferred embodiment of break away lever 200 from a first and a second direction showing the working components of break away lever 200. The three main components of break away lever 200 are a base, such as rotary wheel 302, a lever assembly 304, and a coil spring 320. The Lever assembly 304 engages the base to rotate the base when an amount of force sufficient to rotate pivot rod 106 and handle 103 (not depicted in FIGS. 3 and 4) is applied to lever assembly 304.

When an excessive amount of force is applied to lever assembly 304, lever assembly 304 disengages from the base and rotates freely about axis 110.

In the preferred embodiment, the base is rotary wheel 302 which is circular with two planar surfaces and rotates about axis 110. A first surface 350 of rotary wheel 302 is depicted in FIG. 3. Coupling member 303 protrudes axially from the center of surface 350. Aperture 351 of coupling member 303 receives pivot rod 106 of tape drive 100 (not depicted in FIG. 3) to coaxially couple rotary wheel 302 to pivot rod 106. In the preferred exemplary embodiment, wedge 301 has a flat surface mated to fit flat against a flat surface of a notch on pivot rod 106. The mated wedge 301 and pivot rod 106 fit securely into aperture 351. The coaxial coupling of pivot rod 106 and rotary wheel 302 causes pivot rod 106 to rotate about axis 110 when rotary wheel 302 rotates about axis 110.

A second surface 450 of rotary wheel 302 is depicted in FIG. 4. Second surface 450 of rotary wheel 302 has a plurality of slots 408–410 proximate the circumference of surface 450. Each of slots 408–410 is mated to receive one of teeth 305–307 (See FIG. 3) of gear wheel 308. A first wall 420 and a second wall 421 of each slot 408–410 are sloped at the same angle as first and second sides 390 and 391 of teeth 305–307 (See FIG. 3). This allows teeth 305–307 to slide upwards along first or second walls 420 and 421 when an excessive force is applied to arm 210. The sliding disengages lever assembly 304 from rotary wheel 302 to prevent pivot rod 106 from being rotated.

In the preferred embodiment, a plurality of resets ramps 402–407 are defined by protrusions on surface 450 sloping upward from each edge of first and second walls 420/421 of slots 408–410 and curving around circumference of rotary wheel 302. After teeth 305–307 (See FIG. 3) slide out of slots 408–410, each of teeth 305–307 slides up a reset ramp 402–407 until the excessive force being applied to arm 210 ceases. After the excessive force ceases, a force exerted by coil spring 320 causes teeth 305–307 to slide down reset ramps 402–407 and into slots 408–410.

Orienting element 401 protrudes axially from second surface 450 of rotary wheel 302 in the preferred embodiment. Axial opening 309 (depicted in FIG. 3) of lever assembly 304 receives orienting element 401. Spring coil 320 fits into coil receiving aperture 412 around the protruding orienting element 401. Retaining coil 340 is affixed to orienting element 401 to secure rotary wheel 302, lever assembly 304, and spring coil 320 in place.

The second main element of break away lever 200 is lever assembly 304. In the preferred embodiment, lever assembly 304 has a gear wheel 308 and an arm 210 extending from the circumference of the gear wheel 304. FIG. 3 shows first surface 352 of lever assembly 304. Gear wheel 308 is circular with two planar surfaces and is coaxially mounted on rotary wheel 302. A force in the direction indicated by arrow 370 that is applied to arm 210 causes arm 210 and gear wheel 308 to rotate about axis 110.

In order to toggle handle 103 of tape 100 (not depicted in FIG. 3), a robotic arm applies a force in one of the directions indicated by arrow 370 to arm 210. In the preferred embodiment, fingers 311 and 313 are defined by protrusions from arm 210. Fingers 311 and 313 facilitate contact of the robotic arm to exert a force to arm 210. A curved, recessed surface between fingers 311 and 313 defines a camming surface 312 to guide a robotic arm through the motion of exerting a force in the directions indicated by arrow 370 on arm 210. The guiding of the robotic arm by camming surface 312 controls the amount of force the robotic arm exerts on arm 210.

In a preferred embodiment, axial opening 309 is in the center of gear wheel 308 and is receives orienting element 401 (See FIG. 4) to orient gear wheel 308 and rotary wheel 302. First surface 352 of gear wheel 308 has a plurality of teeth 305–307 which are defined by protrusions on surface 352 near the circumference of gear wheel 308. Each tooth 305 has a first wall 391 and a second wall 392 which are radial to body 304 and slope upward and inwards toward each other to form ramps on each tooth 305. Slots 408–410 (See FIG. 4) on second surface 450 (see FIG. 4) of rotary wheel 302 are mated to receive teeth 305–307. When a proper amount of force needed to rotate handle 103 is applied to arm 210, teeth 305–307 remain in mated slots 408–410 (See FIG. 4) and exert a force on the walls 420/421 (See FIG. 4) of the slots which rotates rotary wheel 302 as described below in FIG. 5. When an amount of force in excess of the force needed to rotate handle 103 is applied to arm 210, teeth 305–307 slide upwards out of the mated slots 408–410 (see FIG. 4) to prevent the force from being exerted on base 202. The disengaging process of the break away ramps sliding out of the slots is discussed below in FIG. 6.

Second surface 451 of lever assembly 304 is depicted in FIG. 4. Coil receiving aperture 412 is axial to gear wheel 308. Opening 309 is in bottom of receiving aperture 412. Spring coil 320 is received by coil receiving aperture 412. Retaining ring 340 secures a compressed spring coil 320 inside of aperture 412 by affixing to orienting element 401. Washer 330 fit between spring coil 320 and retaining ring 340 to allow rotational movement between spring coil 320 and retaining ring 340. The compression of spring coil exerts a force on lever assembly 304 which biases the position of lever assembly 304 to keep teeth 305–307 (See FIG. 3) inside of slots 408–410 of rotary wheel 302.

Figure 5:
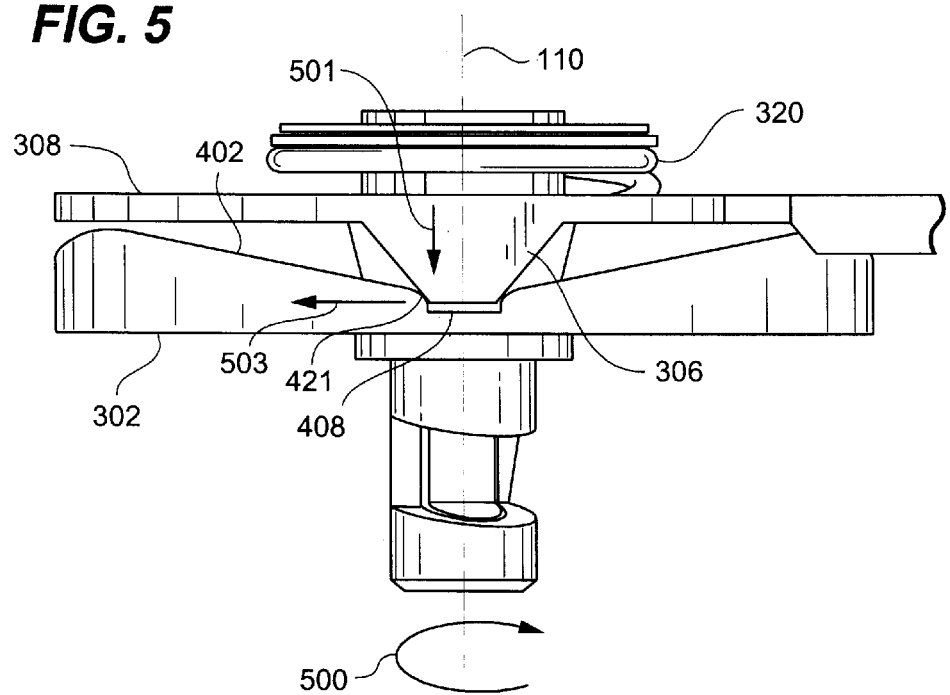
FIG. 5 illustrates the operation of the preferred exemplary embodiment when a force needed to rotate a pivot rod of the tape drive is applied to the preferred embodiment.

FIG. 5 illustrates gear wheel 308 engaging rotary wheel 302 to rotate handle 103 when a proper amount of force to rotate handle 103 is applied to arm 210 (not depicted in FIG. 5) A torque in the direction 500 is exerted on arm 210 (not depicted in FIG. 5) which causes gear wheel 308 to rotate about axis 110 in direction 500. Coil spring 320 exerts a force 501 on gear wheel 308 which keeps the teeth of gear wheel 308 (depicted in FIG. 5 by tooth 306) in the mated slots (depicted by slot 308 in FIG. 5) of rotary wheel 302. The force resulting from the torque in direction 500 is less than or equal to force 501 and the force of friction. Since force 501 and the force of friction are not overcome. Tooth 306 remains inside slot 408 and exerts force 503 on wall 421 of slot 408. Force 503 causes rotary wheel 302 to rotate in direction 500. The rotation of rotary wheel 302 causes pivot rod 106 to rotate and toggles handle 103 (not depicted in FIG. 6) between an open and closed position. The amount of torque that the system can withstand is determined by the tension of the spring, the height of the reset ramps, and the friction between the teeth 305–307 and slots 408–410.

Figure 6:
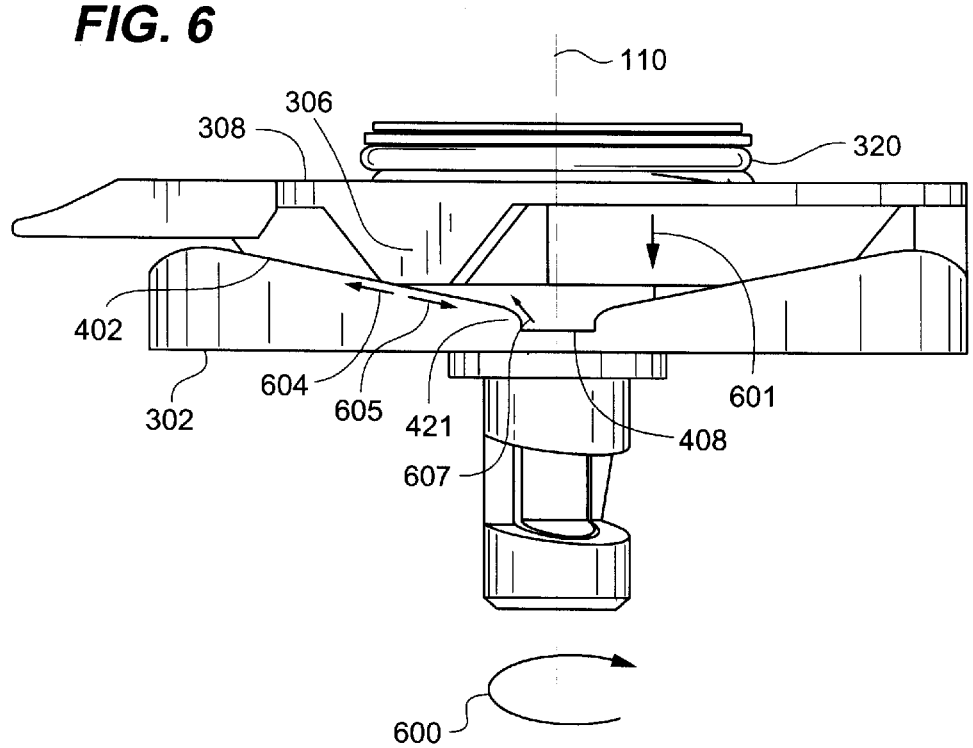
FIG. 6 illustrates the operation of the preferred exemplary embodiment when a force in excess of the force needed to rotate the pivot rod is applied to the preferred embodiment.

FIG. 6 illustrates gear wheel 308 disengaging rotary wheel 302 to prevent the rotating of handle 103 when an excessive force is applied to arm 210 (not depicted in FIG. 6). A torque in the direction 600 is exerted on arm 210 (not depicted in FIG. 6) which causes gear wheel 308 to rotate in direction 600. Coil spring 320 exerts force 601 on gear wheel 308 to secure teeth 305–307 (represented by tooth 306 in FIG. 6) in the mated slots (represented by slot 408 in FIG. 6) of rotary wheel 302. The force resulting from the torque in direction 600 is greater than the sum of force 601 and the force of friction. The overcoming of force 601 and friction causes tooth 306 to slide along wall 421 of slot 408 in direction 607. After tooth 306 slides out of slot 408, reset ramp 402 guides tooth 306 to slide upward in direction 604.

Since no force is exerted on wall 421, rotary wheel 302 is not rotated. When the torque is no longer being applied to arm 210, spring coil 320 exerts force 601 on body 308 which causes tooth 306 to slide in direction 605 into slot 408.

The above disclosed embodiment is one preferred exemplary embodiment of a break away lever of the present invention. Although a specific embodiment is disclosed herein it is expected that persons skilled in the art can and will design alternate break away levers that are within the scope of the following claims either literally or through the Doctrine of Equivalents.

What is claimed is:

1. A method for preventing excessive force exerted on a lever assembly from damaging a handle of a media drive mechanism, said handle being operative for media access in a first position and operative for media non-access in a second position, comprising the steps of:

exerting a force on said lever assembly;

engaging a base with said lever assembly responsive to a predetermined amount of force being exerted on said lever assembly;

moving said handle responsive to said engaging of said base with said lever assembly; and disengaging said base from said lever assembly responsive to said force being excessive.

2. The method of claim 1 wherein said step of engaging comprises the steps of:

positioning teeth defined by protrusions on a first one of juxtaposed surfaces of said base and a body of said lever assembly in slots in a second one of said juxtaposed surfaces of said base.

3. The method of claim 2 wherein said step of disengaging comprises the step of:

sliding said teeth out of said slots responsive to said excessive force on said lever assembly.

4. The method of claim 3 further comprising the step of:

returning said teeth to said slots responsive to said excessive force subsiding.

5. The method of claim 4 further comprising the step of:

biasing said lever assembly to be in a position wherein said base and lever assembly are engaged.

6. The method of claim 1, wherein the step of exerting a force on said lever assembly is performed by robotic manipulation.

7. The method of claim 1, wherein the step of moving said handle comprises rotating a pivot rod coaxially coupled to said base.

8. A method for preventing excessive force exerted on a lever assembly from damaging a handle of a media drive mechanism, said handle being operative for media access in a first position and operative for media non-access in a second position, comprising the steps of:

exerting a force on said lever assembly;

engaging a base with said lever assembly responsive to a predetermined amount of force being exerted on said lever assembly;

moving said handle responsive to said engaging of said base with said lever assembly to position said handle in said first position;

inserting a media into the media drive mechanism;

moving said handle responsive to said engaging of said base with said lever assembly to position said handle in said second position; locking said handle in said second position; and disengaging said base from said lever assembly responsive to said force being excessive.

9. The method of claim 8, wherein the step of exerting a force on said lever assembly is performed by robotic manipulation.

10. The method of claim 8, wherein the step of moving said handle comprises rotating a pivot rod coaxially coupled to said base.

* * * * *